United States Patent
Lefebvre et al.

(10) Patent No.: US 11,473,480 B2
(45) Date of Patent: Oct. 18, 2022

(54) INSTRUMENTED TURBINE EXHAUST DUCT

(71) Applicant: PRATT & WHITNEY CANADA CORP., Longueuil (CA)

(72) Inventors: Guy Lefebvre, St-Bruno-de-Montarville (CA); Remy Synnott, St-Jean-sur-Richelieu (CA); Michael Paolucci, Kirkland (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/178,708

(22) Filed: Feb. 18, 2021

(65) Prior Publication Data
US 2022/0260001 A1    Aug. 18, 2022

(51) Int. Cl.
| | | |
|---|---|---|
| F01D 25/30 | (2006.01) | |
| F01N 13/00 | (2010.01) | |
| F02K 1/78 | (2006.01) | |
| F01D 21/00 | (2006.01) | |

(52) U.S. Cl.
CPC ......... *F01N 13/008* (2013.01); *F01D 21/003* (2013.01); *F01D 25/30* (2013.01); *F02K 1/78* (2013.01)

(58) Field of Classification Search
CPC .............................. F01D 21/003; F01N 13/008
See application file for complete search history.

(56) References Cited

U.S. PATENT DOCUMENTS

| | | | | |
|---|---|---|---|---|
| 2,877,860 A | * | 3/1959 | Hoffar | F01N 1/083 181/246 |
| 2,979,151 A | * | 4/1961 | Blackwell | B64F 1/26 181/217 |
| 2,999,388 A | * | 9/1961 | Herron, Jr. | G01N 27/20 73/866.5 |
| 3,520,133 A | * | 7/1970 | Loft | F02C 7/26 60/790 |
| 3,990,308 A | * | 11/1976 | McCormick | G01K 3/06 374/114 |
| 5,230,214 A | * | 7/1993 | Pechette | F02K 1/04 60/725 |
| 5,404,760 A | * | 4/1995 | Robinson | G01K 13/02 73/863.11 |
| 2002/0029557 A1 | * | 3/2002 | Tobo | F02C 9/28 60/39.091 |

(Continued)

OTHER PUBLICATIONS

Cristian, Dorobat, Gheorghe, Moca, Presura, Elena, Turboprop Engine Nacelle Optimization for Flight Increased Safety and Pollution Reduction, Mar. 2018, Published by INCAS, Aerospace Europe CEAS 2017 Conference, pp. 51-62 (Year: 2018).*

(Continued)

*Primary Examiner* — Todd E Manahan
*Assistant Examiner* — Marc J Amar
(74) *Attorney, Agent, or Firm* — Norton Rose Fulbright Canada LLP

(57) ABSTRACT

A gas turbine engine exhaust system comprises an instrumented exhaust duct including a set of exhaust temperature probes installed at the exhaust end of the duct in an air space between the engine outer case and a surrounding engine nacelle. A shield is removably installed at the end of the exhaust duct to protect the probes and associated wiring in the air space.

20 Claims, 2 Drawing Sheets

(56) References Cited

U.S. PATENT DOCUMENTS

2006/0053802 A1* 3/2006 Sasao ............... F23N 5/003
60/772
2014/0331658 A1* 11/2014 Adupala ............ F01N 13/08
60/324
2016/0356174 A1* 12/2016 Myers ............... G01K 13/02

OTHER PUBLICATIONS https://www.researchgate.net/publication/323693343_Turboprop_Engine_Nacelle_Optimization_for_Flight_Increased_Safety_and_Pollution_Reduction (Year: 2018).*

United Turbine, PT6 Descriptive Course and Guide to Troubleshooting, Dec. 27, 2018, pp. 1-69. (Year: 2018).*

* cited by examiner

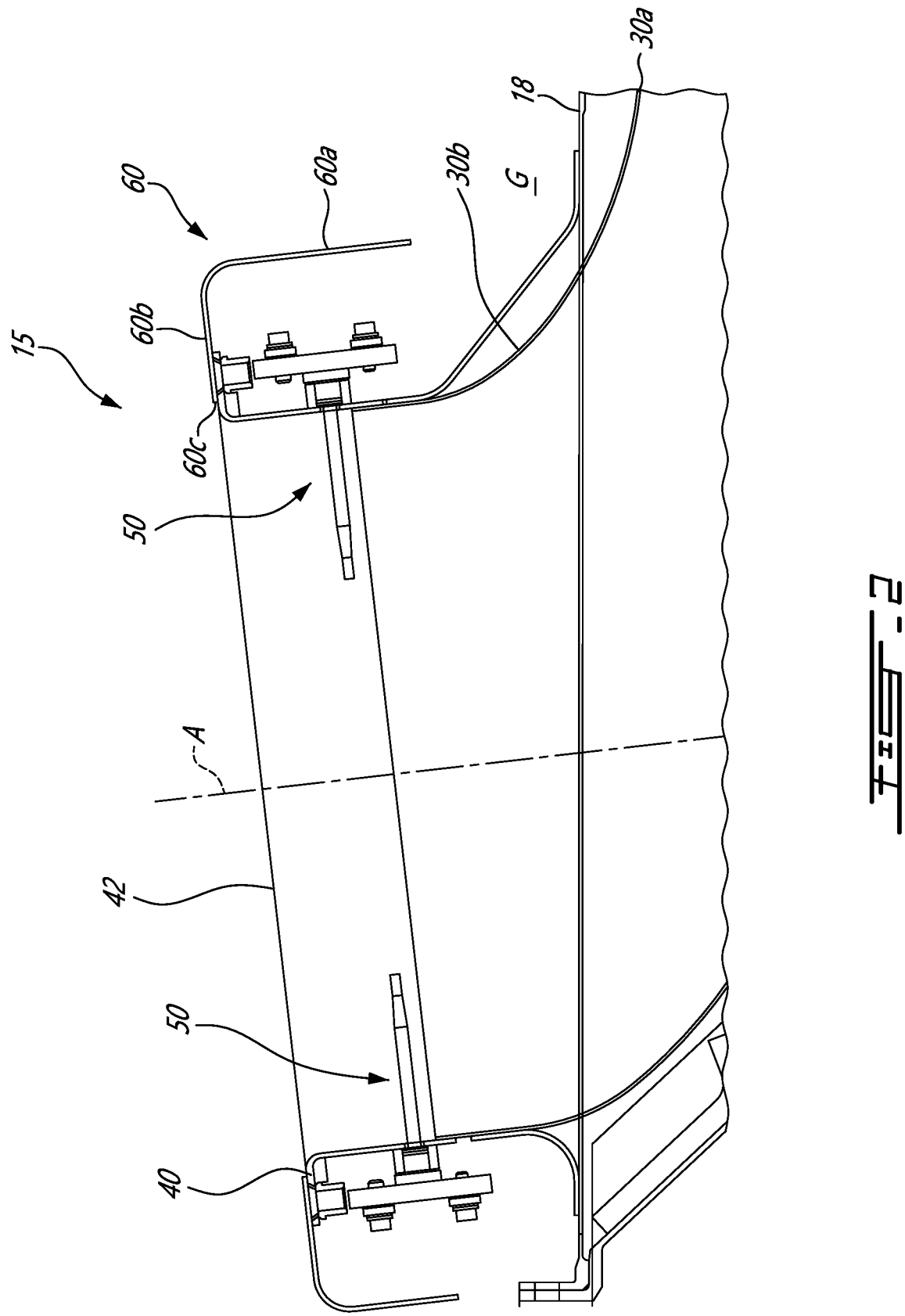

INSTRUMENTED TURBINE EXHAUST DUCT

TECHNICAL FIELD

The application relates generally to gas turbine engines and, more particularly, to an instrumented turbine exhaust duct.

BACKGROUND

Exhaust gas temperature (EGT) probes are used to measure the temperature of turbine exhaust gases. As these probes are used in a harsh environment, they need to be properly protected and periodically inspected/replaced to ensure accurate EGT readings. However, with some engine architectures, access to the probes can be challenging and/or the probes may be exposed to adverse elements, which may negatively affect their durability.

SUMMARY

There is disclosed a gas turbine engine comprising: an outer case; a core inside the outer case, the core including: a combustor, at least one spool mounted for rotation about a central axis, the at least one spool including a compressor and a turbine, an annular gas path extending between the compressor and the turbine about the central axis; and a turbine exhaust duct extending from the annular gas path downstream of the turbine in a direction away from the central axis, the turbine exhaust duct having a downstream end portion projecting outwardly from the outer case, the downstream end portion instrumented with exhaust gas temperature (EGT) probes, the EGT probes distributed around the downstream end portion of the turbine exhaust duct outside the outer case of the gas turbine engine.

There is disclosed an aircraft power plant comprising: a nacelle; a gas turbine engine mounted in the nacelle, the gas turbine engine comprising: an outer case, the outer case and the nacelle defining an gap, a core housed in the outer case, the core including a turbine fluidly connected to a compressor by a gas path extending axially along a central axis, and a turbine exhaust duct extending from the turbine in a direction away from the central axis into the gap between the nacelle and the outer case, exhaust gas temperature probes (EGT) disposed in the gap and projecting into the turbine exhaust duct; and a tailpipe extending from a downstream end of the turbine exhaust duct in the gap and projecting outwardly from the nacelle.

There is disclosed a gas turbine engine exhaust system comprising: a dual port turbine exhaust duct having an inlet conduit portion extending axially along a central axis, and a first and a second outlet conduit portion branching off from the inlet conduit portion, the first and second outlet conduit portions respectively having a first exhaust port and a second exhaust port; a first set and a second set of exhaust gas temperature (EGT) probes respectively mounted to the first and the second outlet conduit portions at the first and second exhaust ports thereof; and a first and a second shield respectively surrounding the first and second sets of EGT probes all around the first and second exhaust ports.

DESCRIPTION OF THE DRAWINGS

Reference is now made to the accompanying figures in which:

FIG. 2 is a schematic enlarged cross-section view of a downstream end of one of the two outlet conduit portions of the turbine exhaust duct and illustrating a protective shield detachably mounted to the duct around the exhaust port to protect the probes in the gap between the nacelle and the outer case of the engine.

DETAILED DESCRIPTION

Figure 1:
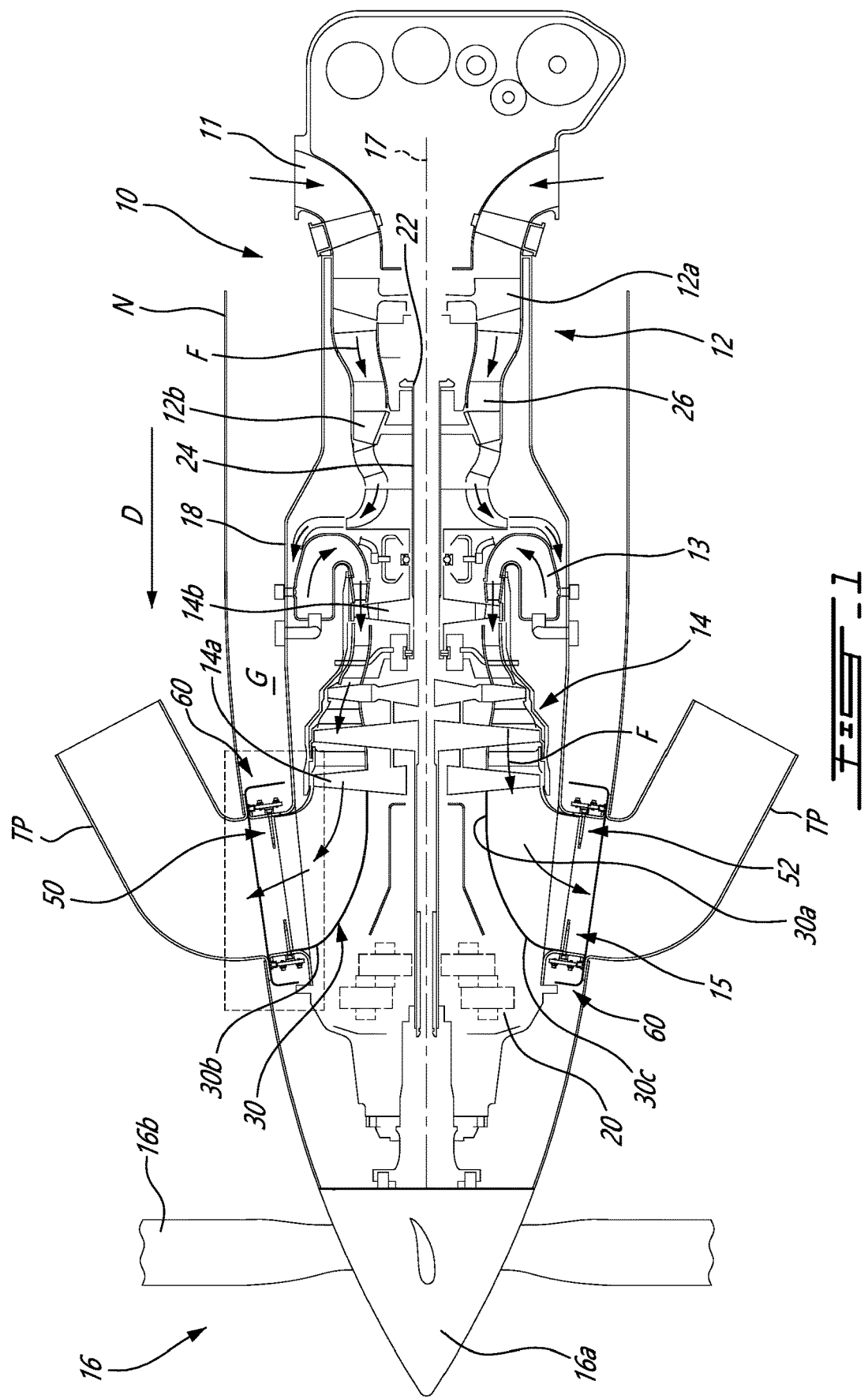
FIG. 1 is a schematic top cross-section view of an aircraft power plant including a reverse-flow gas turbine engine having a non-axisymmetric dual port exhaust duct instrumented with shielded EGT probes, the probes distributed around the two exhaust ports of the duct.

FIG. 1 illustrates an aircraft power plant comprising a nacelle N housing a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust system 15 through which the combustion gases exit the engine 10. The engine 10 has a longitudinal center axis 17. The engine 10 in FIG. 1 is a turboprop engine 10 and includes a propeller 16, which provides thrust for flight and taxiing. The propeller 16 includes a nose cone 16A and propeller blades 16B, which rotate about the center axis 17 to provide thrust. It is understood that the engine 10 can adopt various other configurations. For instance, the engine could be configured as a turboshaft engine having an output shaft connectable to a rotatable load, such as a helicopter rotor or the like.

The engine 10 has an outer case 18 housing a central core through which gases flow and which includes most of the turbomachinery of the engine 10. The illustrated engine 10 is a "reverse-flow" engine 10 because gases flow through the core from the air inlet 11 at a rear or aft portion of the engine 10, to the exhaust system 15 at a front portion of the engine 10. This is in contrast to "through-flow" gas turbine engines in which gases flow through the core of the engine from a front portion to a rear portion. The direction of the flow of gases through the engine 10 is shown in FIG. 1 with arrows F.

It will thus be appreciated that the expressions "forward" and "aft" used herein may refer to the relative disposition of components of the engine 10, in correspondence to the "forward" and "aft" directions of the engine 10 and aircraft including the engine 10 as defined with respect to the direction of travel D. In the embodiment shown, a component of the engine 10 that is "forward" of another component is arranged within the engine 10 such that it is located closer to the propeller 16. Similarly, a component of the engine 10 that is "aft" of another component is arranged within the engine 10 such that it is further away from the propeller 16.

Still referring to FIG. 1, the core of the engine 10 may include one or more spools. The illustrated embodiment is a two-spool engine including a low pressure (LP) spool and a high pressure (HP) rotatable about the center axis 17 to perform compression to pressurize the air received through the air inlet 11, and to extract energy from the combustion gases before they exit the core via the exhaust system 15 at a forward end of the core. The core may include other components as well, including, but not limited to internal combustion engines (e.g. rotary engines such as Wankel engines for compounding power with a turbine of the turbine section), gearboxes, tower shafts, and bleed air outlets.

Each spool generally includes at least one component to compress the air that is part of the compressor section 12, and at least one component to extract energy from the combustion gases that is part of the turbine section 14. More particularly, according to the illustrated embodiment, the LP spool has an LP turbine 14a which extracts energy from the combustion gases, and an LP compressor 12a for pressurizing the air. The LP turbine 14a and the LP compressor 12a can each include one or more stages of rotors and stators, depending upon the desired engine thermodynamic cycle, for example. The LP spool further comprises an LP shaft 22 drivingly connecting the LP turbine 12a to the LP compressor 14a. Gears (not shown) can be provided to allow the LP compressor 14a to rotate at a different speed than the LP turbine 12a. The LP turbine 12a is also drivingly connected to the propeller 16 via a RGB 20. The RGB 20 allows for the propeller 16 to be driven at its optimal rotational speed, which is different from the rotational speed of the LP turbine 14a.

Still referring to FIG. 1, the HP spool comprises an HP turbine 14b drivingly engaged (e.g. directly connected) to a HP compressor 12b by a high pressure shaft 24. Similarly to the LP turbine 14a and the LP compressor 12a, the HP turbine 14b and the HP compressor 12b can each include one or more stages of rotors and stators.

The LP compressor 12a, the HP compressor 12b, the combustor 13, the HP turbine 14b and the LP turbine 14a are in serial flow communication via an annular gas path 26 extending through the core about the center axis 17. The gas path 26 leads to the engine exhaust system 15 downstream of the turbine section 14.

The exhaust system 15 of the engine 10 comprises a turbine exhaust duct 30 for exhausting combustion gases received from the last stage of the LP turbine 14a. According to the illustrated embodiment, the exhaust duct 30 is a non-axisymmetric dual port exhaust duct configured for directing combustion gases laterally on opposed sides of the outer case 18 of the engine 10 of the aircraft power plant. The dual port exhaust duct 30 is qualified as "non-axisymmetric" because the two exhaust ports thereof are not coaxial to the center axis 17 of the engine (i.e. the exhaust flow discharged from the exhaust duct is not axial, it is rather directed in a direction that diverges from the center axis 17). According to at least some embodiments, the dual port exhaust duct 30 has a generally "Y-shaped" body including an annular central inlet conduit portion 30a extending axially around the center axis 17 for receiving the annular flow of combustions gases discharged from the last stage of LP turbine 14a, and first and second diverging outlet conduit portions 30b, 30c branching off laterally from the central inlet conduit portion 30a. According to some embodiments, the first and second outlet conduit portions 30b, 30c are identical.

As can be appreciated from FIG. 1, the downstream end of each outlet conduit portion 30b, 30c projects outwardly of the engine outer case 18 into an air space or gap G between the outer case 18 and the nacelle N. As best shown in FIG. 2, with reference to the first outlet conduit portion 30b, each outlet conduit portion 30b, 30c terminates into an exhaust port including an annular outer flange 40 surrounding a central exhaust port opening 42. The central exhaust port has a central axis A which is oriented to intersect the center axis 17. According to the illustrated embodiment, the axis A has a main radial component and a secondary (i.e. smaller) axial component relative to the center axis 17. Stated differently, the exhaust port is oriented to direct the combustion gases mainly in a radially outward direction. According to some embodiments, the exhaust port opening 42 and surrounding annular flange 40 are circular. However, it is understood that other geometries are contemplated as well (e.g. oval).

Referring back to FIG. 1, it can be seen that first and second tailpipes TP are respectively detachably mounted to the annular flange 40 of the first and second outlet conduit portions 30b, 30c. The tailpipes TP can be provided with an annular flange complementary to the annular flange 40 of the exhaust duct 30. The tailpipes TP extend outwardly from the nacelle N and curve towards a rearward direction to discharge the combustion gases received from the exhaust duct 30 into the surrounding environment on opposed sides of the nacelle N and with a generally rearward component.

The temperature of the exhaust gases may be used to measure the performance of the engine 10 and to provide an indication of the rate of deterioration of gas turbine engine components. Indeed, the exhaust gas temperature (EGT) is an indicator of engine status, which may be used to measure and control operational and functional characteristics of the engine 10.

Accurate measurement of the EGT level is thus important. To accurately measure exhaust gas temperatures, it is necessary to minimize degradation of the EGT measurement system over time. Therefore, it is desirable to periodically inspect the EGT measurement system and to properly shield the same from the harsh environment in which it is used.

According to the illustrated embodiment, the EGT measurement system comprises first and second sets of operatively interconnected EGT probes 50, 52. The EGT probes 50, 52 are positioned outside the outer case 18 of the engine 10 in the air space/gap G between the nacelle N and the outer case 18. More particularly, the first set of EGT probes 50 is provided at the exhaust port of the first outlet conduit portion 30b, and the second set of EGT probes 52 is provided at the exhaust port of the second outlet conduit portion 30c. By so instrumenting the two exhaust ports of the exhaust duct 30 and positioning the EGT probes 50, 52 outside the engine outer case 18, access to the probes 50, 52 can be facilitated for maintenance and inspection purposes while still providing for accurate monitoring of the engine exhaust gas temperature. Indeed, as opposed to EGT probes positioned in the turbine section of the engine, it is not necessary to split open the gas generator/hot case section of the engine to access the probes.

As best shown in FIG. 2, the EGT probes 50, 52 may be distributed in predetermined positions around the exhaust port of each outlet conduit portion 30b, 30c of the exhaust duct 30 and inserted to a predetermined depth into the duct to establish the temperature of the combustion gases as they exit the exhaust duct 30. According to an embodiment, six probes are uniformly circumferentially distributed around the exhaust port of each outlet conduit portion 30b, 30c. The exhaust gas temperature profile for a particular engine may be determined by using a plurality of probes or thermocouple elements so arranged around each exhaust port at various penetration depths.

The EGT probes 50, 52 of a same set are electrically interconnected by a wiring harness (not shown) outside of the exhaust duct 30. The probes 50, 52 and the associated harness at the end of each outlet conduit portions 30b, 30c are protected by a shield 60. As best shown in FIG. 2, each shield 60 has a cap-shaped body including a cylindrical skirt 60a extending from an outer periphery of end wall forming an annular inward flange 60b around a central opening 60c. The flange 60b is complementary to the annular flange 40 at the end of each outlet conduit portion 30b, 30c of the exhaust duct 30 and is adapted to be detachably connected thereto such as by bolting or the like. According to the embodiment shown in FIG. 1, the flange 60b of the shields 60 are sandwiched between the flanges of the exhaust duct 30 and the tailpipes TP. That is the shields 60 are mounted at the interface between the exhaust duct 30 and the tailpipes TP. In this way, access to the probes 50, 52 can be readily provided by opening the nacelle N, detaching the tailpipes TP from the dual port exhaust duct 30 and then removing the shields 60 from the exhaust ports of the exhaust duct 30. Once, the probes 50, 52 have been inspected, replace or reinstalled, the shields 60 can be bolted back to the exhaust ends of the exhaust duct 30 in order to protect the probes 50, 52. As best shown in FIG. 2, once installed in position, the skirt 60a of each shield 60 surrounds the associated probes 50, 52 all around each exhaust end of the exhaust duct 30. The central opening 60c of the shield 60 may be sized to be slightly larger than the exhaust port opening 42 so as to not interfere with the flow of exhaust gases. The central opening 60c of the shield is centered relative to axis A once the shield 60 has been properly secured to the flange 40 at each exhaust end of the exhaust duct 30. The skirt 60a is configured to form an annulus around each exhaust end of the exhaust duct 30. The head of the probes 50, 52 and the wiring harness are accommodated in this annulus. The shields 60 thus form a physical barrier to protect the probes 50, 52 and associated wiring in the air space/gap G from tool, parts or fluid surrounding the engine outer case 18. In addition to providing a physical protection, the shields 60 provide thermal shielding to the probes 50, 52. According to some embodiments, the shields 60 contribute to improve the EGT probes 50, 52 functionality and durability by decreasing the risk of probes or wire damages.

According to some embodiments, each shield 60 has a unitary body made from Inconel 625 or other suitable sheet metal material pressed or stamped into an inverted cup-shaped body.

The embodiments described in this document provide non-limiting examples of possible implementations of the present technology. Upon review of the present disclosure, a person of ordinary skill in the art will recognize that changes may be made to the embodiments described herein without departing from the scope of the present technology. For instance, while the instrumented exhaust duct has been described in the context of a dual port exhaust duct, it is understood that the technology described in the instant application is also applicable to a single port exhaust duct. Yet further modifications could be implemented by a person of ordinary skill in the art in view of the present disclosure, which modifications would be within the scope of the present technology.

The invention claimed is:

1. A gas turbine engine comprising:
an outer case;
a core inside the outer case, the core including:
  a combustor,
  at least one spool mounted for rotation about a central axis, the at least one spool including a compressor and a turbine,
  an annular gas path extending between the compressor and the turbine about the central axis; and
a turbine exhaust duct extending from the annular gas path downstream of the turbine in a direction away from the central axis, the turbine exhaust duct having a downstream end portion projecting outwardly from the outer case, the downstream end portion instrumented with exhaust gas temperature (EGT) probes, the EGT probes distributed around the downstream end portion of the turbine exhaust duct outside the outer case of the gas turbine engine,
wherein the downstream end portion of the turbine exhaust duct defines an exhaust port opening surrounded by an annular flange, and wherein a shield is mounted to the annular flange, the shield having a cylindrical skirt surrounding the EGT probes around the downstream end portion of the turbine exhaust duct and extending from the annular flange toward the outer case.

2. The gas turbine engine defined in claim 1, wherein the shield is detachably mounted to the annular flange.

3. The gas turbine engine defined in claim 2, wherein the outer case of the gas turbine engine is received in an engine nacelle, and wherein the EGT probes are located in a gap between the engine nacelle and the outer case.

4. The gas turbine engine defined in claim 3, wherein the shield is sandwiched between the annular flange of turbine exhaust duct and a corresponding annular flange of a tailpipe projecting outwardly from the engine nacelle.

5. The gas turbine engine defined in claim 4, wherein the shield has an end wall in the form of an annular flange complementary to the annular flange of the turbine exhaust duct and the annular flange of the tailpipe.

6. The gas turbine engine defined in claim 1, wherein the downstream end portion of the turbine exhaust duct terminates into the exhaust port including the annular flange, the EGT probes provided at the exhaust port.

7. The gas turbine engine defined in claim 1, wherein the turbine exhaust duct is a dual port exhaust duct having a Y-shaped body including first and second outlet conduit portions branching off from a central annular inlet conduit coaxial to the central axis.

8. The gas turbine engine defined in claim 7, wherein the exhaust port is a first exhaust port and the shield is a first shield, and wherein the EGT probes include a first set of EGT probes electrically interconnected and distributed about the first exhaust port of the first outlet conduit portion, and a second set of EGT probes electrically interconnected and distributed about a second exhaust port of the second outlet conduit portion, and wherein the first shield and a second shield are respectively mounted to the first and second outlet conduit portions, the first shield surrounding the first set of EGT probes, the second shield surrounding the second set of EGT probes.

9. The gas turbine engine defined in claim 2, wherein the shield has a cap-shaped body including an end wall, the annular skirt depending from a periphery of the end wall, the end wall defining a central opening aligned with the exhaust port opening of the turbine exhaust duct, the annular skirt circumscribing an annulus around the downstream end portion of the turbine exhaust duct, the EGT probes projecting into the annulus.

10. The gas turbine engine defined in claim 9, wherein the end wall is bolted to the annular flange of the turbine exhaust duct.

11. The gas turbine engine defined in claim 10, wherein the gas turbine engine is a reverse-flow gas turbine engine in which combustion gases flow in a forward direction from an air inlet at an aft end of the core to the turbine exhaust duct at a forward end of the core.

12. An aircraft power plant comprising:
a nacelle;
a gas turbine engine mounted in the nacelle, the gas turbine engine comprising:

an outer case, the outer case and the nacelle defining an gap, a core housed in the outer case, the core including a turbine fluidly connected to a compressor by a gas path extending axially along a central axis, and a turbine exhaust duct extending from the turbine in a direction away from the central axis into the gap between the nacelle and the outer case to a downstream end of the turbine exhaust duct in the gap, exhaust gas temperature probes (EGT) disposed in the gap and projecting into the turbine exhaust duct; and a tailpipe extending from the downstream end of the turbine exhaust duct in the gap and projecting outwardly from the nacelle, wherein the downstream end portion of the turbine exhaust duct defines an exhaust port opening surrounded by an annular flange, and wherein a shield is mounted to the annular flange, the shield having a cylindrical skirt surrounding the EGT probes around the downstream end portion of the turbine exhaust duct and extending from the annular flange toward the outer case.

13. The aircraft power plant defined in claim 12, wherein the EGT probes are capped with the shield mounted at an interface between the turbine exhaust duct and the tailpipe.

14. The aircraft power plant defined in claim 13, wherein the shield has the annular flange surrounding a central opening and the cylindrical skirt projecting from the annular flange, the cylindrical skirt surrounding the EGT probes all around the downstream end of the turbine exhaust duct.

15. The aircraft power plant defined in claim 14, wherein the annular flange of the shield is bolted to the annular flange of the turbine exhaust duct with the central opening of the shield in registry with the exhaust port opening of the turbine exhaust duct.

16. The aircraft power plant defined in claim 15, wherein the tailpipe has an annular flange, the annular flange of the shield sandwiched between the annular flange of the tailpipe and that of the turbine exhaust duct.

17. A gas turbine engine exhaust system comprising:
an outer case;

a dual port turbine exhaust duct having an inlet conduit portion extending axially along a central axis inside the outer case, and a first and a second outlet conduit portion branching off from the inlet conduit portion, the first and second outlet conduit portions respectively terminating outside the outer case into a first exhaust port and a second exhaust port;

wherein the first exhaust port includes a first exhaust port opening surrounded by a first annular flange, the second exhaust port including a second exhaust port opening surrounded by a second annular flange;

a first set and a second set of exhaust gas temperature (EGT) probes respectively mounted to the first and the second outlet conduit portions at the first and second exhaust ports thereof; and a first and a second shield mounted to the respective first and second annular flanges;

wherein the first and second shields have a respective first and second cylindrical skirt respectively surrounding the first and second sets of EGT probes all around the first and second exhaust ports and the first and second cylindrical skirts extending from the respective first and second annular flanges toward the outer case.

18. The gas turbine engine exhaust system defined in claim 17, wherein the first and second shields are respectively detachably mounted to the first and second annular flanges.

19. The gas turbine engine exhaust system defined in claim 17, wherein the first and second shields each have a cap-shaped body including an end wall and the respective first and second cylindrical skirt depending from a perimeter of the respective end wall, the end wall defining a central opening for alignment with a corresponding exhaust port opening of each of the first and second outlet conduit portions of the turbine exhaust duct.

20. The gas turbine engine exhaust system defined in claim 19, wherein the respective first and second cylindrical skirt of the first and second shields is sized to circumscribe an annulus around an associated one of the first and second outlet conduit portions of the turbine exhaust duct.

* * * * *